May 5, 1964 YOSHIRO NAKAMATSU 3,131,937

MAGNETIC RECORD SHEET

Filed March 31, 1959 2 Sheets-Sheet 1

May 5, 1964 YOSHIRO NAKAMATSU 3,131,937

MAGNETIC RECORD SHEET

Filed March 31, 1959 2 Sheets-Sheet 2

United States Patent Office 3,131,937 Patented May 5, 1964

3,131,937
MAGNETIC RECORD SHEET

Yoshiro Nakamatsu, 2–62 Shimouma-cho, Setagaya-ku, Tokyo, Japan

Filed Mar. 31, 1959, Ser. No. 803,241
Claims priority, application Japan Apr. 1, 1958
14 Claims. (Cl. 274—41.4)

The present invention relates to method for signal recording, reproducing and erasing and apparatus for performing such functions, more particularly, method for forming signal record track comprising a number of spiral signal track loops proceeding as a whole in a predetermined line which may be circular, rectangular, straight line or any other desired shape on a signal record sheet or tape; reproducing such signal record track; and erasing such signal record track; as well as an apparatus for performing such functions.

The object of the present invention is to provide a method and an apparatus which achieves excellent signal recording and reproducing with a simple concise inexpensive apparatus.

Another object of the present invention is to provide a method and an apparatus by which a long sound recording and reproducing can be achieved using a signal record sheet or tape of relatively small area.

Other features and the advantages of the present invention will be clarified by explanations made hereinafter with reference to accompanying drawings wherein, FIG. 1 is a plan view of a signal record sheet on which a signal record track of a circular form in general is recorded according to the present invention;

Figures 1, 2, 3, 4, 5, 6, 7, 8, 9, 10, 11, 12, 13, 14:
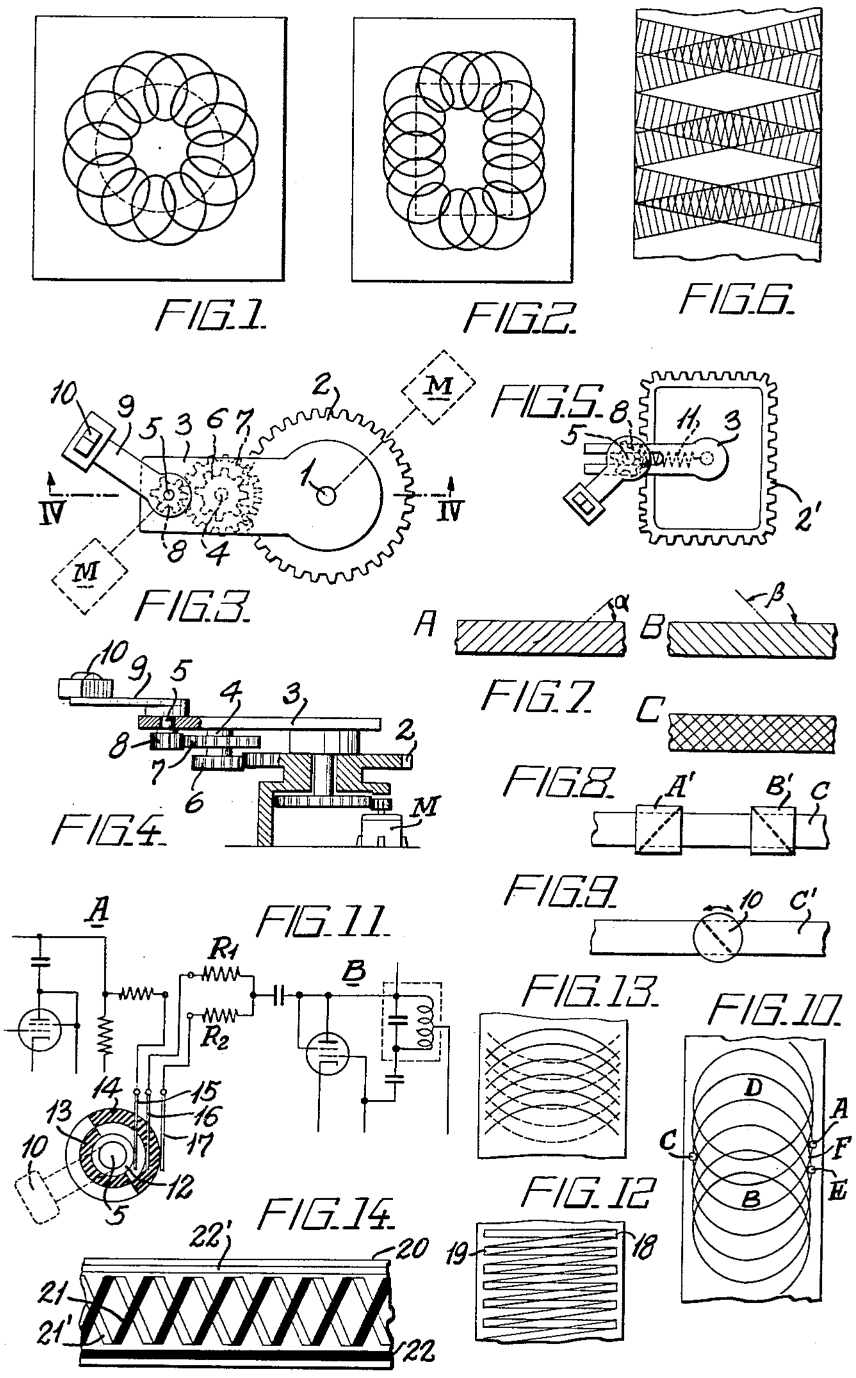
FIG. 2 is a plan view similar to FIG. 1, but the form of the signal track in general is rectangular.
FIG. 3 is a diagrammatic plan view of an apparatus for forming the signal track of FIG. 1.
FIG. 4 is a diagrammatic sectional view of the apparatus of FIG. 3 taken along the line IV—IV of FIG. 3.
FIG. 5 is a diagrammatic plan view of an apparatus for forming a track as illustrated in FIG. 2.
FIG. 6 is a view illustrating two tracks intersecting on an enlarged scale.
Figure 15:
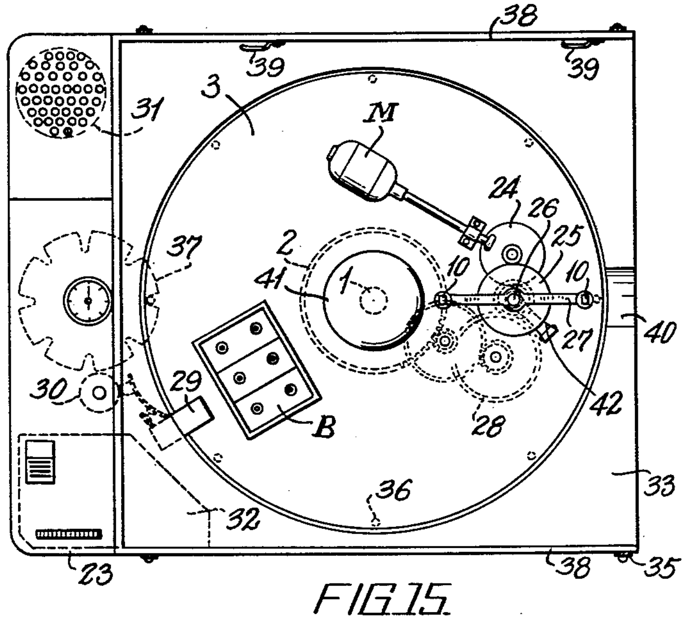
Figure 16:
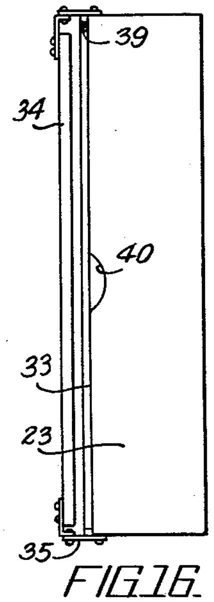
Figure 17:
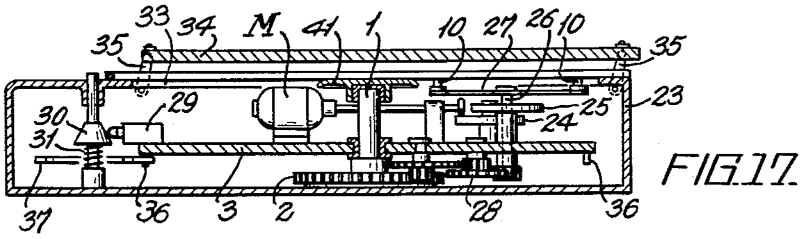
Figure 19:
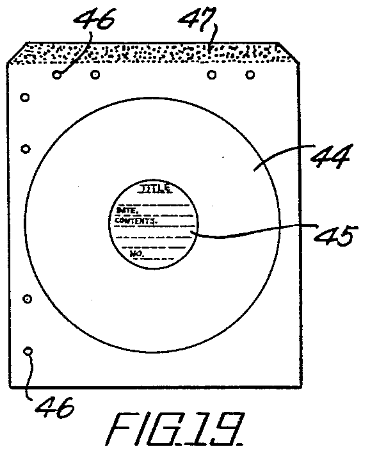
Figure 18:
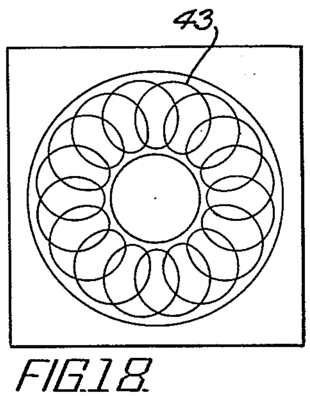

FIG. 7*a* illustrates a track formed with a head inclined in one direction;

FIG. 7*b*, a track formed with a head inclined in opposite direction and FIG. 7*c*, a track comprising the above two tracks in overlapping relation;

FIG. 8 illustrates an example of forming tracks of FIG. 7*c* using different heads;

FIG. 9 illustrates an example of forming tracks of FIG. 7*c* using one head which can be adjusted to have different directions as to the gap of said head;

FIG. 10 illustrates a sound track consisting of a number of loop tracks proceeding in a straight line with many intersecting points;

FIG. 11 is a diagrammatic view illustrating an apparatus and an electric system for applying to the track of FIG. 10 different bias depending on the portion of the track so that the interference between the intersecting tracks can be prevented;

FIG. 12 illustrates a zig-zag track in an enlarged scale showing the overlapping condition of tracks at the opposite ends;

FIG. 13 illustrates tracks formed by a plurality of heads on a turn table rotated in one direction and in the opposite direction and intersecting with one another;

FIG. 14 illustrates a video-tape on which a sound track and a video track taken in the delivery of the tape in one direction and another sound track and another video track taken in the delivery of the tape in the opposite direction are formed and the two video tracks are in overlapping relation;

FIG. 15 is a general diagrammatic plan view of an example of apparatus for tracing a record track as shown in FIG. 1 or FIG. 18;

FIG. 16 is a side view of the apparatus of FIG. 15 viewed from the right side;

FIG. 17 is a sectional view of the apparatus of FIG. 15, some parts of the apparatus being taken away for the clarification of the drawing;

FIG. 18 is a diagrammatic plan view of a record sheet showing the record track traced by the apparatus of FIG. 15; and FIG. 19 is a similar view as FIG. 18 provided with descriptions in the central portion and filing holes on the edges.

In order to form a sound track as illustrated in FIG. 1, an apparatus as illustrated in FIGS. 3 and 4 may be used.

In FIGS. 3 and 4, a plate 3 is mounted rotatably on an axle 1 of a fixed gear 2. On the plate 3 is fixed an axle 4 around which gears 6 and 7 are rotatably mounted. Another axle 5 is rotatably mounted in a fixed position on plate 3. The axle 5 has a fixed arm 9 at the end of which a sound recording and reproducing head 10 is fixed.

When the axle 5 is rotated by a motor M, the gear 7 is rotated through a gear 8 fixed on the axle 5. The gear 7 is integral with the gear 6 and rotatable around the axis 4, and hence the gear 6 is also rotated. The gear 6 is in meshing engagement with the fixed gear 2 and thus the gear 6 is rotated along the periphery of the fixed gear 2 to cause the rotation around the axle 1 of the whole of the plate 3, the gears 6, 7, 5, the arm 9 and the head 10 while the head 10 is moved to rotate on the axle 5 to trace a continuous sound track consisting of a number of spiral loops proceeding along a circular line as illustrated in FIG. 1.

FIG. 5 illustrates an example of an apparatus of tracing a sound track as illustrated by FIG. 2 which has a rectangular form in general. In this case, the fixed gear 2 of FIG. 3 is replaced by a rectangular gear 2′. In this embodiment, the intermediate gears 6 and 7 are omitted and the gear 8 is directly meshed with the fixed gear 2′. The axle 5 of the gear 8 is slidably mounted in a slot provided in the plate 3 and is pulled by a spring 11 to secure the engagement between the gears 2′ and 8. The similar simple construction may be used in the case of tracing the sound track of FIG. 1.

While in the examples above described, the axle 5 is rotated, the axle 1 may be rotated instead of the axle 5. It is further to be understood that the general form of the sound track may be altered to any desired shape, simply by changing the shape of the fixed gear. For instance, if the fixed gear is replaced by a rack, the general form of the track is made a straight line which is very convenient when it is intended to form a sound track on a narrow tape.

While the explanation is made in respect of the case where the head is moved, the same result will be obtained by moving the sound track carrier (sheet or tape) instead of the head, or by moving both the head and the carrier, so long as the relative motion between the head and the carrier is altered during the operation to have the head trace on the carrier in a desired form.

As illustrated in FIGS. 1 and 2, the sound track loop of the present invention is in overlapping relation with other sound track loops in the vicinity and has many intersecting points. These intersections do not cause much interference so long as the angle of intersection is greater than about 30° according to the experiments by the inventor. However, it is desirable to prevent any interference of the overlapping sound track.

According to this invention, the prevention of the interference by the other overlapping track can be achieved by changing the angle of the inclination of the gap (slit) of the recording or reproducing head. According to the researches by the inventor, it has been found that a satisfactory result can be obtained when the direction of the gap of the head in one track is made different by more than about 30° from the direction of the gap of the head in the overlapping track. FIG. 6 illustrates an example of overlaping tracks. When the angle is 90°, the best result is obtained and when the angle is near 90°, substantially no interference is observed even if the two tracks are in completely overlapping relation. FIG. 7 illustrates a track A formed by a head inclined by angle $\alpha$, a track B formed by a head inclined by angle $\beta$ and an overlapping track C comprising the tracks A and B in the same place. For forming a compound track as shown by C, a tape C′ is to be recorded firstly with a head A′ or B′ and thereafter with the other head B′ or A′ separately (see FIG. 8). When this tape is reproduced with the head A′ or B′, one track of the overlapping tracks will be reproduced selectively.

In the operation as described above, it is not necessarily required to have a plurality of heads and, if desired, the operation can be attained by single head, if it is so arranged that the inclination of the gap of a head may be varied. FIG. 9 is a diagrammatic view showing the principle of the operation with single head. In the drawing, the head 10 is rotatable to adjust the angle of the inclination of the head in relation to the tape C′, and thus the overlapping tracks like C in FIG. 7 can be easily formed with one head.

It has been found by the inventor that when the angle between the direction of the gap of a head and the direction of the gap of another head is greater than about 30°, the interference between the tracks recorded with these heads is so little that the reproduction of the track can be effected satisfactorily enough for practical use.

Accordingly, if desired, tracks up to six may be recorded in overlapping relation on one same record carrier by changing the direction of the gap. This will bring about a great economy.

As described above, the interference between intersecting or overlapping tracks may be prevented by changing the inclination of the angle of the gap of a recording and reproducing head. However, according to the investigation of the inventor, still better result can be attained if different bias is applied to each of the intersecting or overlapping tracks. In the following, the application of different bias to each of intersecting or overlapping tracks will be explained.

FIG. 10 illustrates a sound track comprising many sound track loops proceeding in straight line. Assume that the part ABC has a bias of a certain value, for example, bias voltage of 60 v. and the part CDE has a bias of a different value, for example of 30 v. At point F, the two parts intersect with each other, but they do not interfere with each other because of the difference of bias just like cars crossing on different levels. According to this example, all the parts of the track running from right to left are made to have a certain value of bias which is different from the value of bias of all the parts of the track running from left to right. Thus the interference at all intersecting points will be avoided completely.

FIG. 11 illustrates a mechanism and electrical circuit for imposing bias of different values depending upon the part of the track. In the drawing, the head 10 has an arm 9 rotatable together with the axle 5 on which slip rings 12 for sound signals and slip rings 13 and 14 for controlling bias are integrally fixed. Sound signals are introduced from an amplifier A through a brush 15 and the slip ring 12 to the head 10 in case of sound recording. On this occasion, a bias is simultaneously introduced from a bias circuit B through a resistance $R_1$, a brush 16 and the slip ring 13 or through a resistance $R_2$, a brush 17 and the slip ring 14. The slip rings 13 and 14 are composed of an insulating material on the half of the circumference and an electric conductive material on the other half of the circumference, and the two rings are so arranged as the conductive part of either one of the two slip rings is connected with the bias circuit B. Accordingly bias of different value is introduced to the head 10 depending on the rotation of the axle 5.

In the above, the application of biases of different values to the intersecting loop sound tracks are described, but it is apparent that the same principle is applicable to superposing sound record tracks of any other form for separating these sound tracks from each other.

FIG. 12 illustrates a sound track in zig-zag form in which sound tracks are in overlapping relation on opposite side ends 18 and 19.

FIG. 13 illustrates another sound track consisting of a number of sound tracks convexed upwardly and a number of sound tracks convexed downwardly and these two kinds of sound tracks are intersected in many points. If the bias value of tracks left to right in FIG. 12 or that of the upwardly convexed tracks in FIG. 13 is made different from the bias value of the tracks right to left in FIG. 12 or that of the downwardly convexed tracks right to left in FIG. 12 or that of the downwardly convexed tracks in FIG. 13 respectively, the interference between the intersecting tracks can be attained satisfactorily. The principle of the application of bias of different values as described above is not limited to sound record tracks but also applicable to the other systems of recording signals.

FIG. 14 illustrates the application of different biases to a video-tape 20. The video-tape has a video signal track 21 inclined to right and a sound signal track 22, both of which are formed when the tape 20 is passed in one direction, and also a video signal track 21′ inclined to left and a sound signal track 22′, both of which are formed when the tape is passed in the reversed direction. A bias of different value is applied depending on the direction of passing the tape and thus the interference of intersecting video signal track can be avoided.

Now one of the examples of the apparatus for the execution of the method of the present invention will be explained with reference to FIGS. 15–17.

The apparatus has a casing 23 in which a gear 2 and an axle 1 are fixed. On the fixed axle 1 is rotatably mounted a turn table 3. On the turn table 3 are mounted a motor M and a battery B. The motor is adapted to rotate a rubber wheel or a gear 24 and a rubber wheel or a gear 25.

The gear 25 has at its center a fixed axle 26 on which one or two heads 10 are fixed by means of an elastic leaf arm 27. It is apparent that when the motor M is operated, the two heads 10 rotate together with the gear 25 and the axle 26. The gear 25 is in engagement with a gear 28 which is in turn in engagement with the fixed gear 2 through a proper gear system according to necessity. Accordingly, the turn table 3 is rotated around the fixed gear 2 when the motor is operated. Thus the heads 10 will be rotated around the fixed axle 1 while being rotated around the axle 26 to trace a track is illustrated in FIG. 1.

The operation of the motor M is controlled by a switch 29 which is operated by a press button 30 urged normally upward by a spring 31 to cut off the circuit. When the sound recording or reproducing has been completed, the rotation of the turn table is stopped together with the rotation of the head by means of the press button 30 mentioned above which comes in contact with the switch 29 to cut off the motor circuit again.

In the case 23, various instruments such as a microphone or a speaker 31 and an amplifier 32 are accommodated, and a panel plate 33 having a wide circular window is fixed on the case and on this panel plate a magnetic sound record sheet or a pile of the magnetic record sheets is placed facing the magnetic film downwardly.

On the top of the casing 23, a transparent pressing plate or frame 34 is mounted by means of hinged arms 35 so that the pressing plate or frame 34 can be moved up and down maintaining a position parallel to the surface of the panel plate 33. The heads 10 are pressed against the surface of the magnetic sound record sheet mounted on the panel plate 33 by means of an elastic arm 27 and recording and reproducing can be effected.

In the apparatus as described above, the position of the heads cannot be seen from the top. In order to see the position of the heads easily, indication pins 36 provided on the circumference of the turntable 3 and an indication disc 37 is provided as shown in FIG. 15. When the turn table is rotated, one of the indication pins 36 comes in the engagement with the indication disc 37 by turn to rotate the disc and the degree of the rotation of the disc can be seen from the top by a proper scale provided on the surface of the panel plate 33.

As shown in FIG. 15, the panel plate 33 has projected edges 38 on three sides and a sound record sheet is placed between these edges and the sheet can take a proper position on the panel plate by the guidance of these edges. On the upper side edge of FIG. 15, leaf springs 39 are shown. These springs serve to press the sheet mounted on the panel plate against the opposite side to facilitate the setting of the sheet in position. On the side where no projection is provided, a notch or hole 40 is provided to allow inserting a finger or fingers from the side. The provision of such a hole facilitates the operation of withdrawing a completed sheet, particularly when a pile of a number of sheets is placed between the pressing plate 34 and the panel plate 33.

In the operation of the apparatus, the central portion of the record sheet is not to be recorded. In order to maintain the sheet in a horizontal position despite a wide window of the panel plate 33, it is preferably to provide an auxiliary supporting plate 41 in the position corresponding to the central portion of the turn table 3. The auxiliary supporting plate 41 may be fixed on the casing 23 or may be rotatably mounted on the fixed axle 1.

In the above example, two heads are used simultaneously, but it is to be understood that the recording and reproducing can be effected satisfactorily with one head. However, the inventor prefers to use two heads since he has found that a better result is obtained with two heads through his experiments. When two heads are used, the heads may be connected in series or in parallel but it is preferable to connect them in series in the light of the experiments conducted by the inventor. When two springs are used and are connected in parallel, the apparatus can be used conveniently for obtaining stereophonic sound system.

In the example above explained, the application of bias as explained with reference to FIGS. 10 and 11 is not used. But it is apparent that said application can be conducted readily by using slip rings and brushes as explained with reference to FIG. 11. In FIG. 15, 42 indicates a slip ring brush which may be used for the supply or delivery of a signal.

When a magnetic sound record sheet is formed by the apparatus, the sound record track 43 as shown in FIG. 18 is obtained. The sides, particularly the corners, and the central portion of the sheet are not used for recording the track. Accordingly, magnetic coating material such as $Fe_2O_3$ or $Fe_3O_4$ is applied by printing or otherwise only in an annular portion 44 of the sheet as shown in FIG. 19 for the sake of economy. The central blank portion 45 may be used for describing the number, the title, or any other indication as desired, while the edge blank portions may be used for providing filing holes or marks or any descriptions as desired. Further a place 47 for pasting may be provided along the edge.

In the above, explanations have been made in respect of sound recording and reproducing but the principle of the present invention is also applicable to optical system.

As will be seen from the above, according to the invention, a record track carrier can be used with many tracks in overlapping or superposing relation, and these tracks can be effectively separated in the use of said carrier with an apparatus which is simple, concise and inexpensive.

The track is continuous and has no abrupt interuption or change of direction and consequently smooth and excellent recording and reproducing can be conducted.

When the apparatus as illustrated in FIG. 15 is used, a long recording or reproducing is completed with one rotation of the turn table and consequently the rotation speed of the turn table is very slow. This means saving of the energy required for the operation. When the turn table completes the recording or reproducing, it is returned to the starting point and does not require the adjustment of the position. This saves much trouble in operation.

In the method and the apparatus for the present invention, it is not necessary to use a number of recording and reproducing heads which are expensive, but a single head or two heads are sufficient for the operation; thus reducing the cost of the apparatus.

Further, with the apparatus of the present invention, recording and reproducing is conducted with one head or two heads which are in contact with the sheet all the time, and it is not necessary to move the head vertically to bring the head in contact or to remove the head from the contact. This makes the construction of the apparatus and the operation thereof simple and more smooth.

What I claim is:

1. A record medium comprising a record sheet, a deposit of magnetic coating material on the sheet, and a record track on said coating in the form of overlapped intersecting loops extending along a path on said coating in which the distance as measured along said loops is substantially greater than the distance along said path.

2. A record medium comprising a record sheet, a deposit of magnetic coating material on the sheet, and means forming a record track in said coating in the form of overlapped loops extending along a path in said coating in which said overlapped loops may be reproduced without interfering with one another.

3. A record medium comprising a record sheet, a deposit of magnetic coating material on the sheet, and a record track on said coating in the form of overlapped intersecting loops extending along a closed path.

4. A record medium as claimed in claim 3 wherein said closed path is substantially a circle.

5. A record medium as claimed in claim 3 wherein said closed path is in part comprised of straight length.

6. A record medium as claimed in claim 5 wherein said closed path is rectangular.

7. A record medium as claimed in claim 3 wherein the loops of the record track define inner and outer borders for the track, said deposit of coating material being on the sheet only within said borders, the remainder of the sheet being exposed.

8. A record medium as claimed in claim 7 comprising an adhesive portion peripherally on the sheet.

9. A record medium as claimed in claim 8 wherein holes are provided in the sheet in a zone outside said borders.

10. A record medium as claimed in claim 3 wherein said record sheet is rectangular.

11. A record medium as claimed in claim 3 wherein the overlapped loops intersect one another at distinct points of intersection, said intersecting loops defining an angle between one another at each of said points of intersection of at least 30°.

12. A record medium as claimed in claim 3 wherein the overlapped loops intersect one another at distinct points of intersection, said intersecting loops at each intersection having different levels of bias to enable reproduction without interference from intersecting loops.

13. A record medium as claimed in claim 12 wherein half of each loop has a first bias and the other half of each loop has a second bias different from the first bias and the halves of successive loops having different biases from one another overlap each other.

14. A record medium as claimed in claim 3 wherein said overlapped intersecting loops are endless.

References Cited in the file of this patent

UNITED STATES PATENTS

| | | |
|---|---|---|
| 2,144,844 | Hickman | Jan. 24, 1939 |
| 2,600,573 | Rabkin | June 17, 1952 |
| 2,668,718 | Roberts | Feb. 9, 1954 |
| 2,712,572 | Roberts | July 5, 1955 |
| 2,772,328 | Lyon | Nov. 27, 1956 |
| 2,832,839 | Muffly | Apr. 29, 1958 |
| 2,886,330 | Halftermeyer | May 12, 1959 |
| 2,955,896 | Fritzinger | Oct. 11, 1960 |
| 3,022,078 | Hoshino | Feb. 20, 1962 |

FOREIGN PATENTS

| | | |
|---|---|---|
| 529,197 | France | Sept. 5, 1921 |
| 840,165 | Germany | Sept. 8, 1952 |
| 174,220 | Austria | Mar. 10, 1953 |